Aug. 30, 1960   J. H. STRAW   2,950,654
MACHINE TOOL

Filed Jan. 10, 1956   5 Sheets-Sheet 1

INVENTOR.
Jesse H. Straw
BY Edward J. Noe Jr.
Atty

Aug. 30, 1960    J. H. STRAW    2,950,654
MACHINE TOOL
Filed Jan. 10, 1956    5 Sheets-Sheet 2
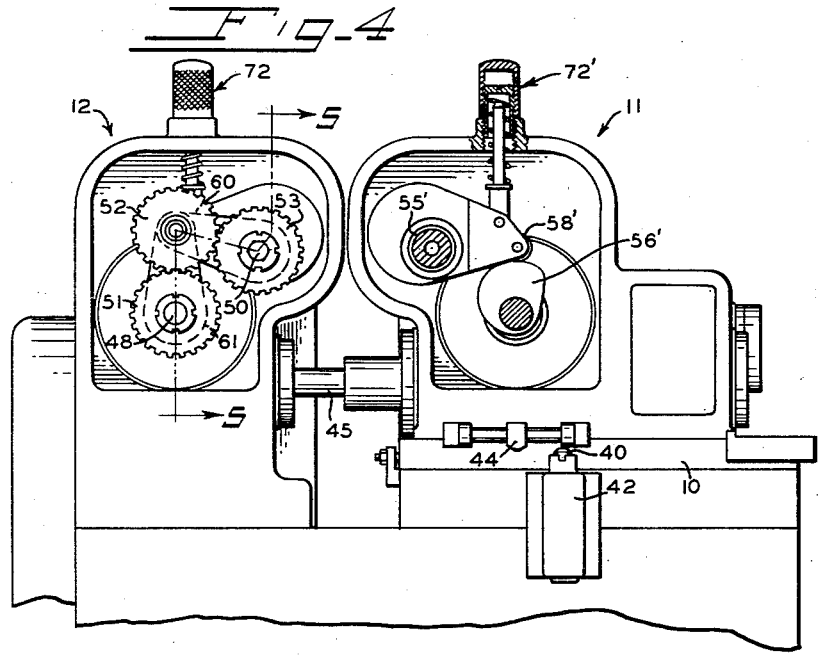
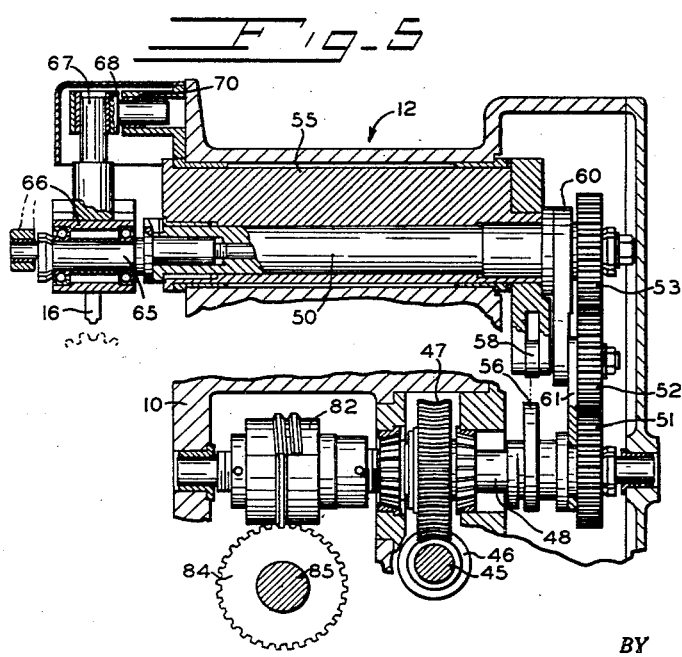
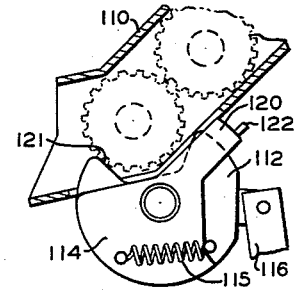
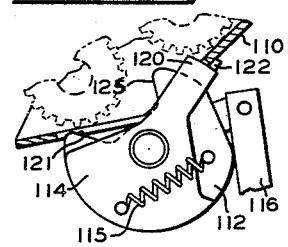
INVENTOR.
Jesse H. Straw
BY Edward J. Hoeg
Atty.

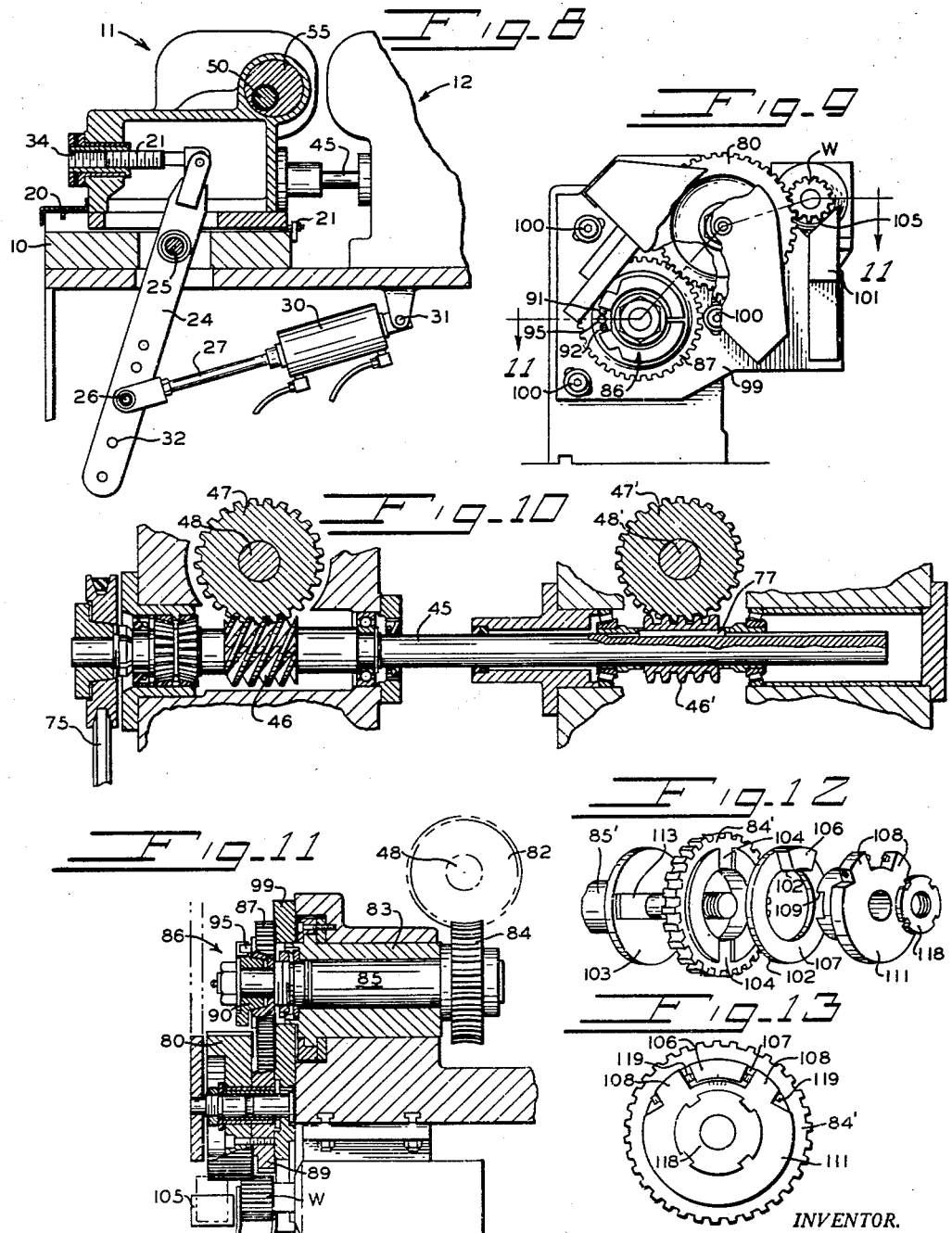

Aug. 30, 1960 J. H. STRAW 2,950,654
MACHINE TOOL
Filed Jan. 10, 1956 5 Sheets-Sheet 4
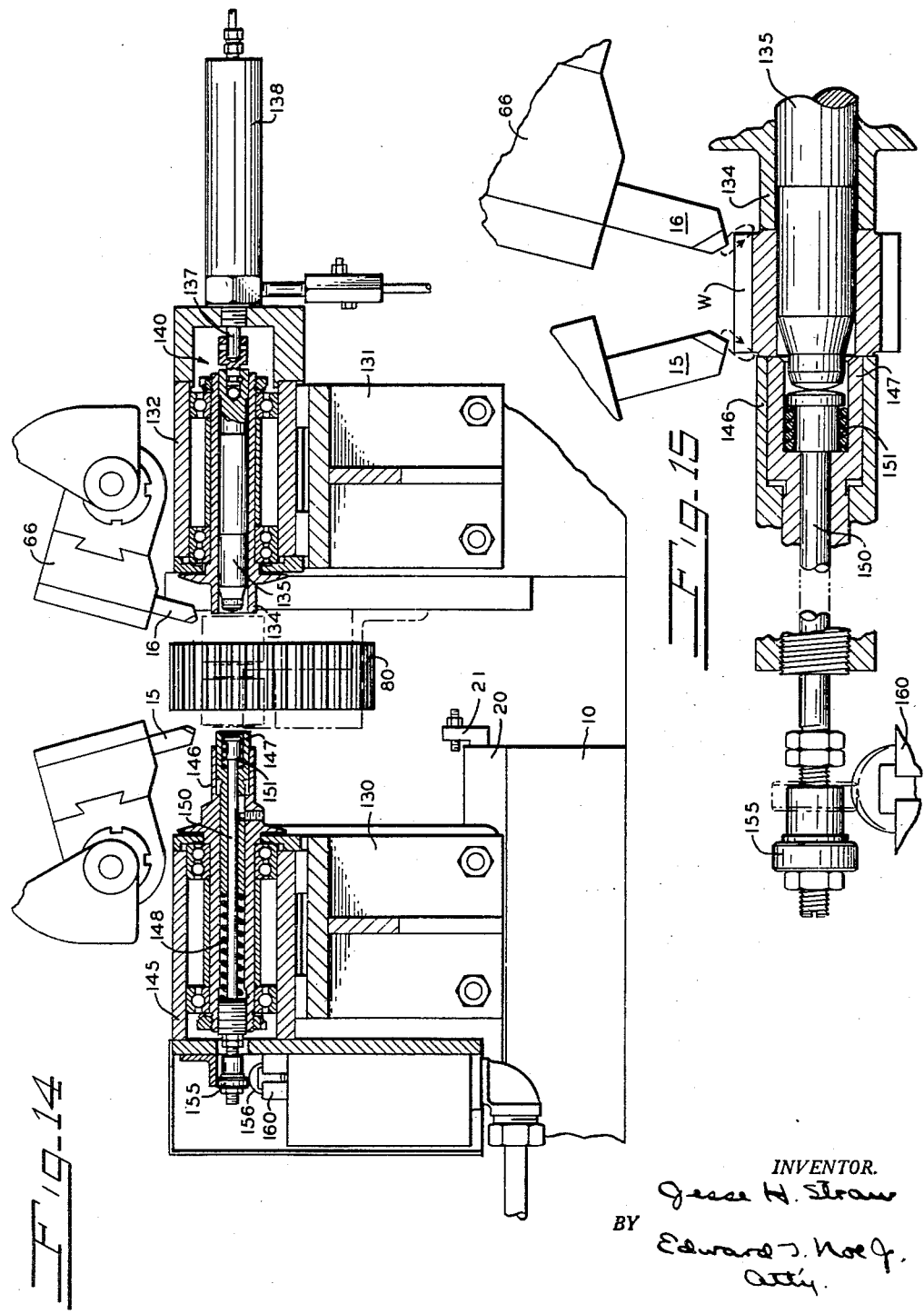
INVENTOR.
Jesse H. Straw
BY Edward J. Noeg
Atty.

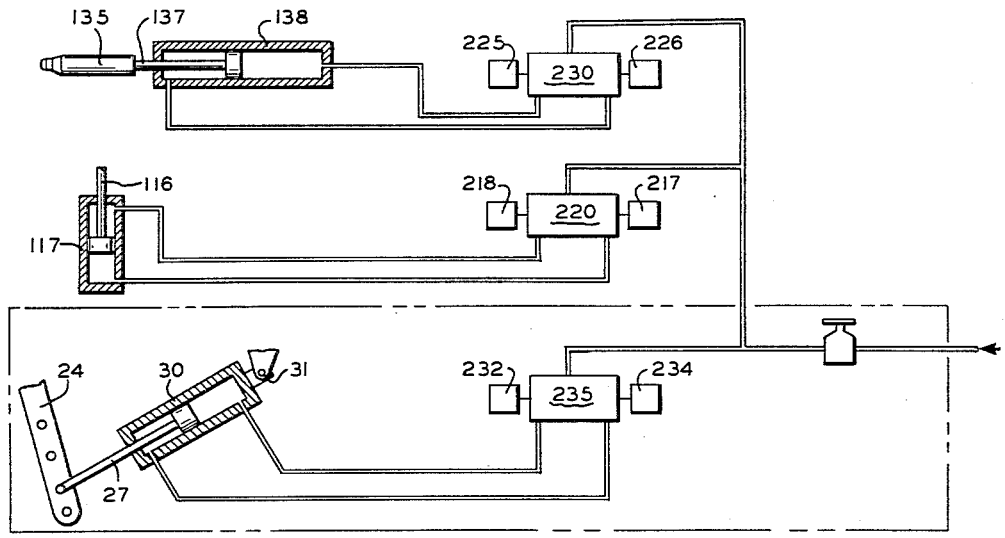
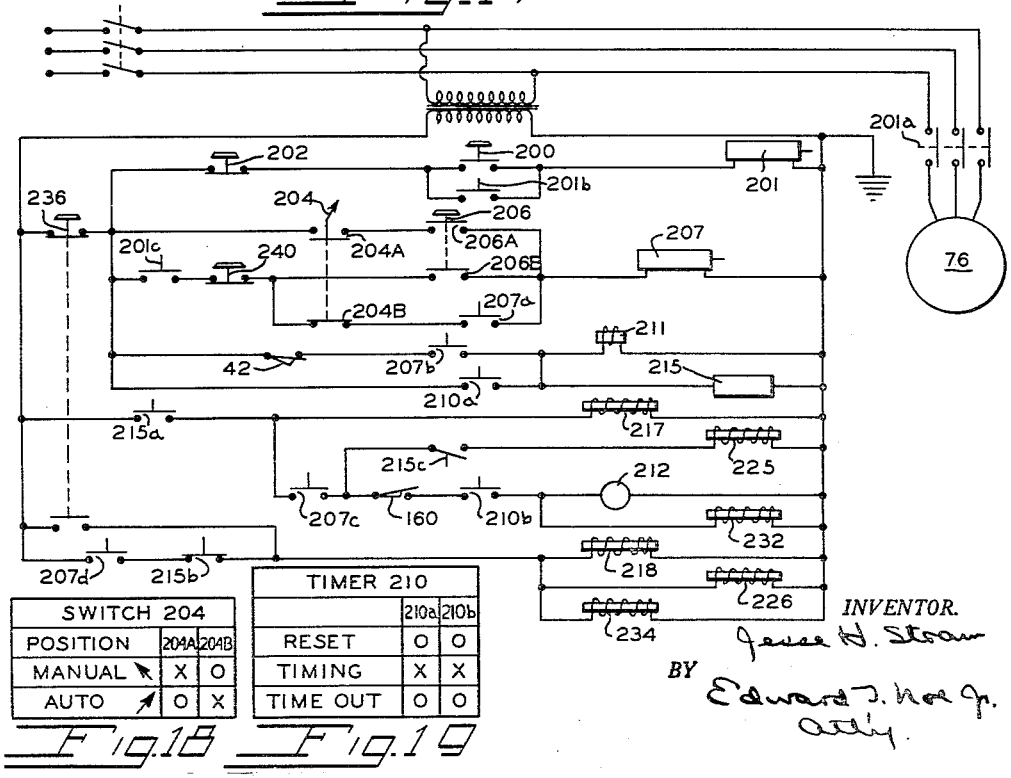

United States Patent Office 2,950,654
Patented Aug. 30, 1960

2,950,654

MACHINE TOOL

Jesse H. Straw, Brookville, Ohio, assignor, by mesne assignments, to The Sheffield Corporation, a corporation of Delaware Filed Jan. 10, 1956, Ser. No. 558,244

20 Claims. (Cl. 90—1.4)

This invention relates to machine tools and more particularly to chamfering or deburring machines.

It is an object of this invention to provide a machine for rapid chamfering and end edges of toothed parts such as gears or the like wherein parts are automatically loaded and unloaded during the cyclic operation for high production and whereby uniform, precise chamfering results are obtained.

It is a further object to provide a machine for chamfering toothed parts wherein axially spaced end edges of teeth are simultaneously chamfered in a uniform manner by relatively moveable cutter heads, each positioned relative to the edges to be formed by engagement with an end face of the part.

It is a further object to provide a simple and rugged mechanism for automatically loading and unloading parts for chamfering in a continuous cyclic manner.

It is a further object to provide a chamfering machine for continuous operation and high production wherein parts to be chamfered are automatically loaded by gravity into a receiving means and into engagement with an index drive and are released following chamfering for further downward movement by gravity.

It is a further object to provide a chamfering machine wherein an index gear is driven in timed relation to chamfering cutter means, and work gears sequentially loaded into mesh with the index gear and clear of the cutter means are then driven and simultaneously moved along the index gear into chamfering position.

Figure 1:
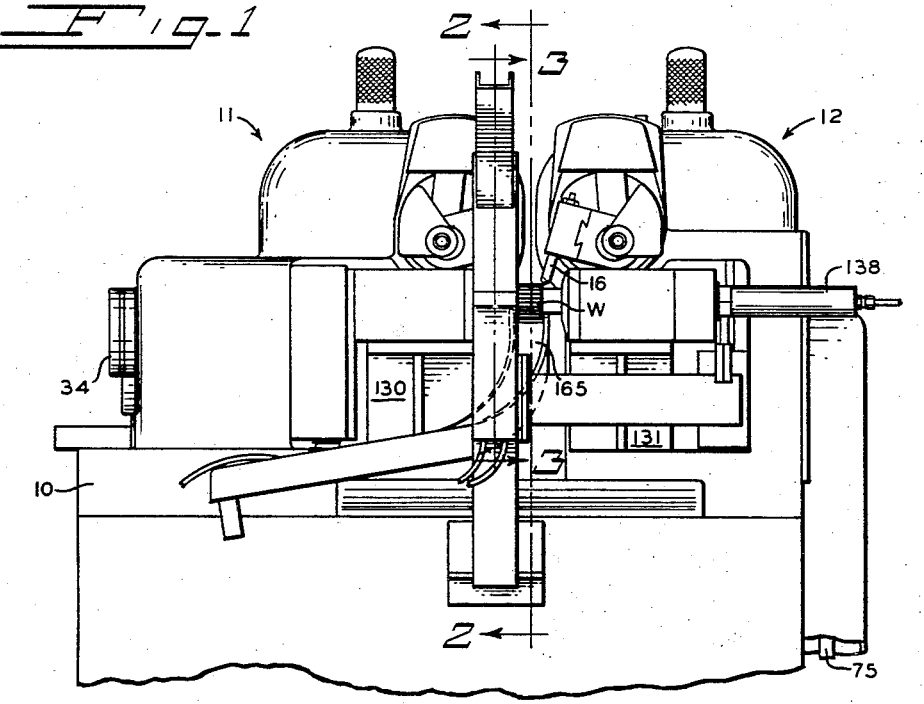

Other objects and advantages of the invention will be apparent from the following description, the appended claims, and the accompanying drawings, in which, Figure 1 is a front view of a chamfering machine embodying the present invention and having a pair of cutter heads for simultaneously chamfering axially spaced end edges.

Figure 2:
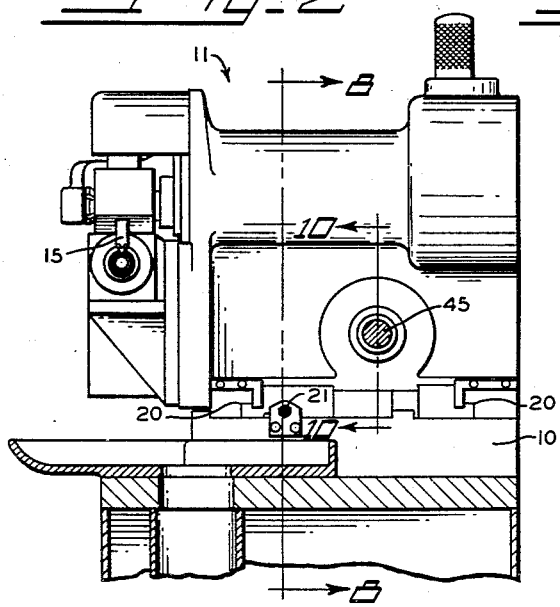
Figure 3:
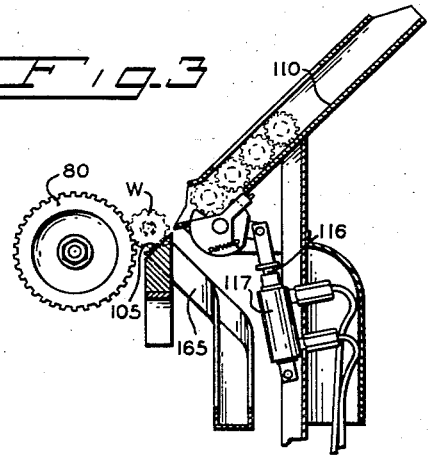

Figure 2 is a view taken on line 2—2 of Figure 1,

Figure 3 is a fragmentary sectional view through a portion of the loading means at 3—3 in Figure 1, Figure 4 is a view of the rear of the machine with the cutter head covers removed and the right-hand head in partial section, Figure 5 is a sectional view illustrating the cutter drive means taken on line 5—5 of Figure 4, Figures 6 and 7 are enlarged fragments showing different positions of the loading escapement means, Figure 8 is a sectional view through the mechanism for moving the left-hand cutter head of Figure 1 to and from chamfering position, taken on line 8—8 of Figure 2, Figure 9 is an end view of a portion of the drive for the index gear, Figure 10 is a sectional view taken on line 10—10 of Figure 2 illustrating the main drive between the cutter heads, Figure 11 is a sectional view through the index drive on line 11—11 of Figure 9, Figure 12 is an exploded illustration of a modified timing adjustment between the index and cutter drives and Figure 13 is an end view of this modification, Figure 14 is a longitudinal section through the part supporting and positioning structure, Figure 15 is an enlarged portion of Figure 14, illustrating a work gear in chamfering position, Figure 16 is a diagram of an air system for actuating the various machine components, Figure 17 is the electrical circuit involved in the automatic operation, and Figures 18 and 19 are charts of various switch conditions in the circuit of Figure 17.

The machine of the present invention is provided for the rapid chamfering or deburring of toothed parts such as gears, and the like. Where the term chamfering is employed it is intended to apply to the various operations performed on the end edges of such teeth and including chamfering, deburring, pointing and similar operations.

The present invention provides an automatic handling apparatus for the sequential feeding of parts such as work gears through a chamfering machine in an extremely simple and reliable manner. It also provides a pair of cutter heads for simultaneously chamfering axially spaced end edges of teeth, positioning each of the heads by engagement with an end face of the part to obtain uniform and precise chamfering results.

A loading means positions a work gear in a preliminary position in mesh with an index gear. Then the work gear is accurately positioned insofar as its axis is concerned as by the movement of a supporting spindle or arbor through the gear. After this first location is accomplished the work gear is then moved axially to chamfering position.

In the illustrated application of the invention an escapement drops a work gear into a preliminary position in engagement with an index gear rotating about a horizontal axis between a pair of chamfering cutter heads. One of the heads is fixed on the machine base and the other is slideable relative thereto. After the work gear is in engagement with the continuously driven index gear a supporting spindle is inserted through the work gear and then the gear is engaged by a further positioning means carried by the movable cutter head and is moved along the index gear, as the spindle retracts, into engagement with locating means provided for the fixed cutter head. Inward movement of the movable head is stopped when locating means carried thereby engage an opposite end face of the work gear. In this manner the gear is loaded and positioned for chamfering and the cutter heads are located with respect to the end edges upon which they will operate.

Projection of the spindle through the work gear in supporting relation therewith actuates switch means to start the inward movement of the movable cutter head. The positioning means carried by this head maintain the work gear clear of the respective chamfering cutter until an end face of the gear is against the locating means of the fixed head following which the positioning means retracts and the movable head is firmly positioned by an opposing end face of the work gear.

After the chamfering operation is completed, the supporting spindle is automatically retracted, releasing the work gear and dropping it from chamfering position into a receiving chute.

Referring more particularly to the drawings, the exemplary machine illustrated for the purpose of disclosing the features of the present invention comprises a base 10 supporting a pair of cutter heads 11 and 12, driving cutters 15 and 16 for simultaneously chamfering end edges on a work gear driven by an index drive between the heads. Cutter head 12 is adjustably fixed on base 10 while head 11 is slideable towards head 12 to chamfering position and is retracted for loading. Ways 20 support and guide cutter head 11 for its sliding movement and an adjustable stop 21 serves as an inward limit if a work gear is not in chamfering position.

The actuating mechanism for moving head 11 along ways 20 is shown most particularly in Figure 8. Lever 24 is pivoted at 25 on base 10. The upper end of lever 24 is pivotally connected to member 21 threaded within coupling 34 on head 11 and the lower end of the lever is pivotally connected at 26 to a piston rod 27 extending from cylinder 30. Cylinder 30 is pivoted at 31 on base 10. Rod 27 can be connected to lever 24 at any one of openings 32, providing an adjustment for the range of movement of head 11. By rotating coupling 34 the position of head 11 on base 10 can be adjusted. When the head is retracted the roller 40 of a switch unit 42 is engaged by an adjustable dog 44 carried at the rear of head 11 to close the switch.

The cutter drives for the two heads are similar, being of right and left hand as illustrated. Figure 5, taken on the broken section line 5—5 of Figure 4, illustrates the drive for the right-hand head 12 of Figure 1. A main drive shaft 45 rotatably supported in base 10 and described later in more detail, carries a worm 46 meshing with worm gear 47 on transverse shaft 48. Shaft 48 is connected to rotate a cutter shaft 50 through a gear 51, idler gear 52, and gear 53. Sleeve 55, in which cutter shaft 50 is eccentrically supported is simultaneously oscillated by cam 56 on shaft 48 and cam follower 58 attached to the inner end of sleeve 55. Arms 60 and 61 radial to cutter shaft 50 and transverse shaft 48 respectively, support idler gear 52 and maintain it in continuous mesh with gears 51 and 53 during oscillation of sleeve 55. The gear drive for rotating cutter shaft 50 and the cam movement for oscillating sleeve 55' are shown in end views in Figure 4, the cam drive being illustrated for head 11 and the gear drive for head 12.

Cutter shaft 50 has an eccentric portion 65 at its outer end rotatable within a cutter holder 66 having an arm 67 slideably guided in a holder 68 which is in turn rotatable within a fixed bearing 70. Rotation of cutter shaft 50 would normally result in a movement of cutter 16 which is substantially eliptical. Through the timed oscillation of sleeve 55 this path can be modified as desired for particular movements during cutting and to clear interfering surfaces of a work gear where necessary. The cam followers are urged into engagement with the respective cams by means of adjustable spring structure indicated at 72 and 72'.

Figure 10 particularly illustrates the common drive to heads 11 and 12 through main drive shaft 45. This shaft is driven through a belt 75 driven in turn by an electric motor 76 mounted in base 10 and only indicated diagrammatically in the electric circuit of Figure 17. Worm 46 driven by shaft 45 meshes with worm gear 47 driving transverse shaft 48 for head 12. Similarly worm 46' on shaft 45 drives worm gear 47' and shaft 48' for cutter head 11. The cutter heads are continuously driven while relatively separated, during their movement toward one another, and during chamfering. In order to maintain an operative drive under these conditions worm 46' is slidably keyed at 77 to shaft 45 to maintain an operative drive as head 11 slides relative thereto.

A wide face index gear 80 carried by head 12 and disposed between the heads meshes with the work gear and is driven in timed relation to the cutter movements to rotate the work gear for chamfering. The index drive is illustrated most particularly in Figures 9 and 11. Transverse shaft 48 drives a worm 82 meshing with a worm gear 84 driving a shaft 85 supported by eccentric mounting 83 in head 12. Mounting 83 is adjustable to shift the axis of shaft 85 for different sets of worms and worm gears. Shaft 85 is driveably connected through a timing adjusting 86 with gear 87 meshing with gear 89 fixed to index gear 80.

A clamping member 90 having a tapered portion within gear 87 is slideably keyed to the inner end of shaft 85 and carries adjustable set screws 91 and 92 engaging a pin 95 fixed to gear 87. Through relative adjustments of set screws 91 and 92 the rotational position of gear 87 on shaft 85 can be adjusted as desired to vary the relative timing between index gear 80 and the drives for cutters 15 and 16. Member 90 is then wedged into gear 87 to maintain the connection firm under conditions of vibration.

A modified timing adjustment is illustrated in Figures 12 and 13. While the timing adjustment can be placed at either end of shaft 85 this modification has been illustrated as applied at the outer end adjacent the right-hand panel of head 12 where it is more accessible. When the timing adjustment is used at the right-hand end of shaft 85 as viewed in Figure 11 the inner end of shaft 85 will be clamped to gear 87 by a wedge member similar to number 90 but the timing adjustment will be omitted.

Worm gear 84' abuts against a flange 103 on shaft 85' and has driving notches 104 in its opposite face into which projections 102 of a coupling member 107 extend. Coupling member 107 has a driving dog 106 projecting between arms 108 on a clamp member 111. Clamp member 111 extends through coupling member 107 and worm gear 84' and a notch 109 at its inner end engages a projection 113 on shaft 85'. Nut 118 threaded onto the outer end of shaft 85' holds the assembly in tight engagement during operation. Arms 108 carry adjustable set screws 119 engaging dog 106 on coupling member 107. Relative adjustments of set screws 119 adjust the position of worm gear 84' on shaft 85' for timing purposes. Calibrations between dog 106 and member 111 aid in set-up.

As shown in Figure 5 index drive worm 82 has a helical portion and a joining circular portion to provide an incremental index of index gear 80 and of the work gear. An index worm of continuous helical form can be provided when a continuous, smooth index is desired.

Index gear 80 as well as gear 89 fixed thereto are supported on a plate 99 adjustable about the axis of shaft 85 and clamped in its adjusted positions by bolts 100 threaded into head 12. Plate 99 has an arm 101 clamped thereon and adjustable vertically which provides a guide surface 105 in opposition to a portion of the index gear 80 at its left-hand end. When a work gear is dropped between index gear 80 and guide 105 by the loading means the work gear becomes meshed with continuously driven index gear 80.

In the loading mechanism illustrated work gears are maintained in an ordered row in an inclined chute 110, note Figure 3, having its lower end directly above and in the plane of locating surface 105. An escapement mechanism is provided for periodically releasing work gears from chute 110 for movement by gravity between guide 105 and index gear 80 for chamfering. As seen in Figures 6 and 7 this escapement comprises a pair of coaxially rotatable plates 112 and 114 linked together by means of a spring 115. Plate 112 is connected to a piston rod 116 extending from air cylinder 117.

When rod 116 is projected upward for loading, plates 112 and 114 rotate counter-clockwise together through an initial movement raising stop arm 120 on plate 114 into the path of the second gear in chute 110 and partially lowering retaining surface 121 on plate 112. When projection 122 on plate 114 engages the lower surface of chute 110 movement of this plate is stopped. Because of the spring interconnection plate 112 can continue its counter-clockwise movement, retracting retaining surface 21 and allowing the work gear to move by gravity into the receiving structure. Simultaneously a projection 125 on plate 112 is carried upward between the first and second gears in chute 110 to break them apart if they are intermeshed.

In feeding helical gears such meshing cannot take place. However, in the case of straight spur gears this escapement serves to release the gears one at a time for feeding and to separate the gears when they have become intermeshed in the chute. To allow movement of a work gear to loading position rod 116 is retracted, raising retaining surface 121 upward into chute 110 and then lowering stop arm 120. This provides an extremely simple structure for automatically loading work gears into the receiving means of the chamfering machine by gravity.

Index gear 80 and arm 101 form parts of a receiving means for locating and clamping the work gear W in chamfering position. The other portions of this receiving structure are illustrated in the sectional views of Figures 14 and 15.

The releasing of a work gear from the loading means and its dropping between guide 105 and index gear 80 is the initial step in a cycle of the continuous operation. At this point both index gear 80 and chamfering cutters 15 and 16 are continuously operating with head 11 retracted from head 12. A timed delay is provided by an electrical circuit later described in more detail to allow the work gear W to become meshed fully with the index gear.

The remaining components of the receiving structure are supported by brackets 130 and 131 vertically adjustable on heads 11 and 12 respectively. Bracket 131 carries a housing 132 rotatably supporting a locating sleeve 134 and a work gear supporting spindle 135 slidable within sleeve 134. Spindle 135 is extended and retracted by means of a piston rod 137 controlled by an air cylinder 138. A connection at 140 between rod 137 and spindle 135 allows relative rotation therebetween. Housing 145 on bracket 130 similarly supports in co-axial alignment with spindle 135 a locating sleeve 146 rotatable within the housing. A co-axial positioning sleeve 147 is spring-urged to the right by spring 148 and a switch actuating rod 150 is urged to the right by spring 151. Flange 155 at the rear end of rod 150 cooperates with roller 156 of switch unit 160.

After a delay to insure meshing of work gear W with index gear 80 spindle 135 is extended to the left through the work gear and in supporting relationship therewith. If the work gear W is properly positioned spindle 135 will engage switch rod 150, moving flange 155 to the position shown in Figure 15 actuating switch unit 160 to close its contacts, thus initiating movement of lever 24 to move head 11 toward chamfering position.

A spur gear in mesh with index gear 80 would be properly timed relative to cutter 15 but it would be objectionable to engage the work gear before it is firmly clamped in position. It is particularly important that helical gears be maintained clear of cutter 15 until in chamfering position. As a helical work gear is moved along a helical index gear it will be rotated because of its endwise movement and not necessarily in time with chamfering cutter 15 until it is also axially positioned for chamfering.

When the right-hand end face of work gear W engages stop or locating sleeve 134 fixed on head 12 the gear is precisely located beyond guide 105 and the disposition of cutter 16 relative to the end edges upon which it will operate is determined. After the movement of the work gear W has been terminated by engagement with locating sleeve 134, during the continued movement of head 11, positioning sleeve 147 moves inward against its spring bias locating sleeve 146 fixed with respect to head 11 is firmly in engagement with an opposing end face of the work gear. This limits the inward movement of head 11 and insures that cutter 15 is properly disposed relative to the end edges which it will chamfer. Pressure is maintained in cylinder 30 during chamfering to keep head 11 in chamfering position and firmly clamp the work gear between the locating means.

Figure 15 shows in dotted lines the paths of cutters 15 and 16 relative to the respective end edges to be chamfered in this illustrative application. If spindle 135 is extended and engages a gear W which is cocked in the receiving means the cutter head does not move in.

Stop 21 adjustable on base 10 prevents further inward movement of head 11 if there is no work gear in position. The inward position of head 11 is normally limited by engagement of locating sleeve 146 with an end edge of the work gear.

Thus it is seen that a gear W is automatically released from chute 110 when surface 121 on escapement plate 112 is retracted. The released gear drops between guide 105 and index gear 80 and is immediately started into rotation. Spindle 135 is then projected through the work gear in supporting relation thereto and engages switch rod 150 to start the inward movement of head 11 to a position determined by the engagement of the work gear with locating sleeve 134 and engagement of locating sleeve 146 with an opposing end face of the gear. A timer in the electrical circuit is set for the proper period required for a complete chamfering operation and then spindle 135 is retracted, releasing the work gear W for movement by gravity downward into a chute 165 to clear the machine for a subsequent chamfering operation. Head 11 is simultaneously retracted and the extension of positioning sleeve 147 keeps the work gear over chute 165 as the spindle 135 and head 11 are retracted. The cycle is continuous and repetitive as long as work gears are supplied to the machine.

The cycle will now be particularly described with reference to Figures 16 and 17.

Drive motor 76 is energized to start the movement of cutters 15 and 16 and the rotation of index gear 80 by depression of start button 200, energizing relay 201. Manually actuated switch 202 acts as a master stop. Energization of relay 201 closes contacts 201a to motor 76. It also closes holding switch 201b around start switch 200 and closes switch 201c.

For an automatic cycle switch 204 is rotated to the right opening contacts 204A and closing contacts 204B. The conditions of the contacts for switch 204 in its manual and automatic positions are shown in the chart of Figure 18.

Depression of cycle start button 206 closes contacts 206A and 206B completing a circuit to cycle relay 207. Relay 207 closes contacts 207a in a holding circuit. It also closes contacts 207b, 207c and 207d.

The circuit includes a commercially available timer which has a clutch coil 211 and a timing motor 212. The chart of Figure 19 shows the conditions of switches 210a and 210b controlled by the timer. In such units when the clutch coil 211 is energized the switch contacts go from the Reset to Timing condition and with motor 212 energized this condition is carried through a predetermined period. At the end of Timing the switches go into Time Out condition. With clutch coil 211 de-energized the switches are once more Reset.

Energization of clutch coil 211 by closing of switch 207b therefore immediately closes switch contacts 210a and 210b, the contacts then being in Timing condition. Closing switch 207b also energizes a second timer 215 of a commercial type which immediately closes switch 215a, opens switch 215b and has a predetermined time delay to close switch 215c. This energizes solenoid 217 actuating valve 220 in the air system of Figure 16 to raise rod 116 and release and drop a part between guide 105 and index gear 80. After a predetermined delay to allow intermeshing of work gear W and index gear 80 switch 215c closes to solenoid 225, actuating valve 230 to extend spindle 135 through the work gear W in supporting relationship therewith and into engagement with switch rod 150 closing switch 160. This energizes motor 212 of timer 210 and the timer goes through its Timing period. Closing switch 160 to solenoid 232 actuates valve 235 to extend rod 27, rocking lever 24 to move head 11 forward.

Depression of manual switch 240 stops the cycle at any time. After the predetermined time interval necessary for the full chamfering of the work gear switches 210a and 210b go into Time Out condition. This opens the circuit to clutch coil 211 and timer 215, switch 42 having been opened when head 11 started forward. De-energization of timer 215 allows the immediate closing of switch 215b to energize solenoids 218, 226 and 234 retracting loading rod 116, suporting spindle 135, and head 11. The work gear is thus released and drops by gravity into the chute 165 as previously described. When head 11 reaches its rearward position it closes switch 42 conditioning the machine for an automatic repetition of the previous cycle. Manual switch 236 serves to retract the various components whenever desired.

Thus it is seen that a chamfering machine has been provided having advantages for simply loading parts into position for chamfering by gravity and releasing the parts for further movement by gravity to clear the machine. Accuracy of positioning and chamfering is assured and a rapid chamfering operation is possible in a fully automatic manner. By locating both cutter heads against reference end faces of the part to be chamfered the position of the cutting paths with respect to the teeth end edges is determined.

It is understood that this invention is not limited to the precise apparatus illustrated but that changes may be made therein without departing from the scope of the invention which is defined in the appended claims.

What is claimed is:

1. A machine for chamfering end edges of gear teeth comprising a base, drive means on said base for reciprocable chamfering cutter means, receiving means on said base for receiving and rotating a work gear including an index gear rotatable about a horizontal axis and driven in timed relation to said drive means the face of said index gear being wider than that of a work gear, said drive means being fixedly mounted at one end of said index gear, means for automatically loading a work gear into operative mesh with said index gear by gravity at the end remote from said drive means, a supporting spindle, means mounting said spindle for movement from said one end of the index gear along said gear and through a work gear in supporting relation therewith, and positioning means movable from the opposite direction to slide the work gear along the index gear toward the drive means to locate the work gear during chamfering.

2. A machine for chamfering gear teeth comprising a base, a cutter head on said base including a cutter holder, an index gear, means for driving said cutter holder and index gear in timed relation, means for placing a work gear in mesh with said index gear in approximate chamfering position through movement transverse the work gear axis, means for then locating the work gear in precise chamfering position including a spindle and means supporting and actuating said spindle for projection into the work gear in supporting relation therewith while the work gear remains in operative mesh with said index gear and in timed relation with movements of the cutter holder, positioning means for engaging and moving the work gear along said index gear to a precise chamfering position, and control means responsive to projection of said spindle through the work gear to energize said positioning means.

3. A machine for chamfering end edges of gear teeth comprising a base, a cutter head on said base including a cutter holder, an index gear means supporting said index gear for rotation about a horizontal axis, means for driving said cutter holder and index gear in timed relation, a guide fixedly mounted on said base cooperating with said index gear to maintain a work gear in mesh with the index gear, the index gear extending beyond said guide in one direction parallel to the axis of the index gear, means for placing a work gear in a preliminary position in engagement with said guide and in mesh with said index gear, means for locating the work gear in precise chamfering position including a spindle and means supporting and actuating said spindle for movement into the work gear in supporting relation therewith while the work gear remains in operative mesh with the index gear, positioning means for engaging and moving the work gear from its preliminary position along the index gear and beyond the guide means to precise chamfering position said actuating means including means for withdrawing the spindle from the work gear upon completion of a chamfering operation to release the work gear for movement by gravity from chamfering position.

4. A machine for chamfering end edges of gears or the like comprising a base, a cutter head on said base including means for driving a chamfering cutter, locating means for engaging an end face of a gear to locate the end edges to be chamfered relative to the cutter, an index gear supported for rotation, means for driving said index gear in timed relation to the cutter drive, a guide extending along a portion of the axial length of the index gear and so inclined as to maintain a work gear placed thereon in operative mesh with the index gear, the face of the index gear extending beyond said guide in one direction parallel to the axis of the index gear a spindle carried on said base for axial movement through the work gear in supporting relation therewith, and positioning means to move the work gear from a receiving position in engagement with both said guide and said index gear along the index gear in said one direction beyond and clear of said guide into positioning engagement with said locating means for chamfering.

5. A machine as set forth in claim 4 including loading means for placing a work gear between said guide and said index gear by gravity and means for retracting said spindle following chamfering to release the work gear for further downward movement by gravity to clear the machine for a subsequent chamfering operation.

6. A machine for chamfering end edges on gear teeth comprising a base, a cutter head mounted on said base including means for driving a chamfering cutter, receiving means cooperating with said cutter head to support and drive a work gear for chamfering, said receiving means including an index gear rotatably supported adjacent said cutter head, drive means between said index gear and said cutter drive for rotating the index gear in timed relation thereto, means for placing a work gear in operative mesh with said index gear but clear of the chamfering cutter, locating means for the cutter head to engage an end face of the work gear to locate the tooth ends with respect to the chamfering cutter, a spindle operably mounted for projection from one direction into the work gear in supporting relation thereto, and positioning means moveable from the opposite direction to move the work gear along the index gear to an inward position determined by the locating means, whereby the gear is located for chamfering.

7. A machine for chamfering end edges of gear teeth, comprising a base, a cutter head on said base including means for driving a chamfering cutter, an index gear rotatably supported adjacent said cutter head, means for rotating said index gear in timed relation to cutter movement, locating means for said cutter head for engagement with an end face of a work gear to be chamfered, means for placing a work gear in operative mesh with said index gear and clear of the chamfering cutter, moveable positioning means for engagement with an opposite end face of the work gear to slide the gear along the index gear to an inward position for chamfering determined by engagement with said locating means, a spindle supported for projection into said work gear from the opposite direction, and a means responsive to projection of the spindle through the work gear for initiating movement of said positioning means to carry the work gear into chamfering position.

8. A machine for simultaneously chamfering axially displaced end edges on toothed parts such as gears or the like, comprising a base, a pair of cutter heads mounted for relative movement on said base, means on said base for receiving and rotating a part to be chamfered, a cutter holder on each head, means for driving the cutter holders in timed relation to part rotation, means for moving one of the cutter heads toward the other for chamfering and to separate the heads for loading, and locating means in fixed relationship to each of the cutter heads for direct engagement with oppositely disposed end faces of the part to determine the positions of the respective cutter heads relative to the end edges to be chamfered.

9. A machine for simultaneously chamfering axially displaced end edges on toothed parts such as gears or the like comprising a base, a pair of cutter heads mounted for relative movement on said base, means on said base for receiving and rotating a part to be chamfered, a cutter holder on each head, means for driving the holders in timed relation to part rotation, means for moving one of the heads toward the other for chamfering and to separate the heads for loading, locating means fixed relationship to each of the heads for engagement with oppositely disposed end faces of the part to clamp the part against endwise movement during chamfering and determine the cutter head positions relative to the end edges to be chamfered, and means supporting the locating means for free coaxial rotation while engaging the part whereby the part is freely driven during chamfering.

10. A machine for simultaneously chamfering axially disposed end edges on toothed parts such as gears or the like, comprising a base, a pair of cutter heads relatively movable on the base, means on said base for receiving and rotating a part to be chamfered, a cutter holder for each head, each head including means for driving the respective cutter holder in timed relation to part rotation, means for relatively moving the cutter heads toward one another for chamfering and to separate the heads for loading, each of said cutter heads having locating means fixed relative thereto for direct engagement with oppositely disposed end faces of the part to clamp the part against endwise movement during chamfering and to determine the positions of the respective cutter heads relative to the end edges to be chamfered.

11. A machine for simultaneously chamfering axially displaced end edges on toothed parts such as gears or the like comprising a base, a pair of cutter heads on said base, each head including means for driving a chamfering cutter, means supporting said heads for relative movement toward one another for chamfering and relative separation for loading, receiving means for supporting and driving a work gear including an index gear between said heads driven in timed relation to cutter movement, loading means for moving a work gear transverse its axis into mesh with said index gear, means for moving said cutter heads to chamfering position, and means for clamping the work gear against endwise movement during chamfering.

12. A machine for simultaneously chamfering axially displaced end edges on toothed parts such as gears or the like, comprising a base, a pair of cutter heads, means fixing one of said heads against movement on said base and carrying the other head for sliding movement relative thereto, receiving means for supporting a part between the heads and with the part axis parallel to the line of relative sliding and including index means for rotating the part during chamfering, each head having means for driving a chamfering cutter in timed relation to part rotation, means for moving said moveable head toward the other to chamfering position and for retracting the head for loading, locating means fixedly positioned on said base for engagement with an end face of the part to locate the part relative to the fixed cutter head, and further locating means carried by the moveable head for engagement with an oppositely disposed end face of the part.

13. A machine for simultaneously chamfering axially displaced end edges on toothed parts such as gears or the like, comprising a base, a pair of cutter heads, means fixing one of said heads on said base and carrying the other head for sliding movement relative thereto, receiving means for supporting a part between the heads and with the part axis parallel to the line of relative sliding, said receiving means including index means for rotating the part during chamfering, each head including means for driving a chamfering cutter in timed relation to said index means, means for moving said moveable head toward the other to chamfering position and for retracting the head for loading, locating means fixed on said base for engagement with an end face of the part to locate the part relative to the fixedly positioned head, means for supporting a part to be chamfered in operative engagement with said index means in an initial position clear of the chamfering cutters, means carried by said moveable head for engagement with an opposite end face of the part to move the part into engagement with the fixed locating means upon inward movement of the moveable head and to determine the inward head position, whereby the part is held against axial movement during chamfering and the positions of the heads relative to the end edges to be chamfered are determined.

14. A machine for simultaneously chamfering opposite ends of teeth on a gear, comprising a base, a pair of cutter heads, means fixing one of said heads on said base and supporting the other for sliding movement relative thereto, an index gear supported between said heads for rotation about a substantially horizontal axis, each of said cutter heads including means for driving a chamfering cutter in timed relation to index gear rotation, means for supporting a gear to be chamfered in operative mesh with said index gear and clear of the chamfering cutters, means cooperating with said index gear including locating means fixed on said base for engagement with one end face of the work gear, said slidable cutter head having locating means for engagement with an opposite end face of the work gear, and means for sliding said head to engage and move the work gear along the index gear to a limited inward position determined by the fixed locating means, whereby the work gear is clamped against endwise movement during chamfering and the positions of the respective cutter heads relative to the end edges to be chamfered are determined.

15. A machine for simultaneously chamfering axially displaced end edges on toothed parts such as gears or the like, comprising a base, a pair of cutter heads, means fixing one of said heads on said base and carrying the other head for sliding movement relative thereto, receiving means for supporting a part between the heads and with the part axis parallel to the line of relative sliding, said receiving means including index means for rotating the part during chamfering, each head including means for driving a chamfering cutter in timed relation to part rotation, means for moving the moveable head toward the fixed head to chamfering position and for retracting the head for loading, locating means fixed on said base for engagement with an end face of the part to locate the part relative to the fixedly positioned head during chamfering, positioning means carried by said moveable head for engagement with an opposite end face of the part to move the part along the index means and to a limited inward position determined by the fixedly positioned locating means, said positioning means including retractable means for maintaining the part clear of the cutter of the moveable head during part movement and locating means for directly engaging an end face of the part to determine the inward position of the moveable head and clamp the part against axial movement during chamfering.

16. A machine for simultaneously chamfering axially displaced end edges on toothed parts such as gears or the like, comprising a base, a pair of cutter heads, means fixing one of said heads against movement on said base and carrying the other head for sliding movement relative thereto, each head including means for driving a chamfering cutter, an index gear supported for rotation between the cutter heads about a horizontal axis and driven in timed relation to the cutter drive, a guide surface extending along a portion of the index gear so inclined as to maintain a work gear in operative mesh with the index gear, a spindle carried on said base for axial movement and through the work gear in supporting relation therewith, locating means fixedly positioned on said base for engagement with an end face of the work gear to locate the gear relative to the fixed cutter head, positioning means carried by said moveable cutter head for engagement with an opposite end face of the work gear, and means for moving the moveable cutter head toward chamfering position to engage and carry the work gear along the index gear and clear of said guide surface to a position determined by said fixed locating means for chamfering.

17. A machine for simultaneously chamfering axially displaced end edges on toothed parts such as gears or the like, comprising a base, a pair of cutter heads, means fixing one of the heads against movement on said base and carrying the other for sliding movement relative thereto, each head including means for driving a chamfering cutter, an index gear supported for rotation between the cutter heads about a horizontal axis and driven in timed relation to cutter drive, a guide extending along a portion of the axial length of the index gear to maintain a work gear in operative mesh with the index gear, loading means including an inclined chute and escapement means adjacent the lower end thereof for separating and releasing a gear for dropping between the guide and index gear in a preliminary position, a supporting spindle carried for axial movement into the work gear, each head including locating means for direct engagement with opposing end faces of the work gear, positioning means carried by the moveable head to move the work gear along the index gear to a final position clear of the guide for chamfering, and means for retracting said spindle following a chamfering operation to release the work gear for downward movement by gravity from chamfering position.

18. A machine for chamfering end edges of gear teeth comprising a base, receiving means for supporting and rotating a work gear to be chamfered including an index gear rotatable about a horizontal axis and means providing a fixed guide surface cooperating with the index gear to receive and place a work gear in operative mesh with the index gear, said index gear extending beyond said guide surface at the end adjacent said drive means, said cutter head including reciprocable means for driving a chamfering cutter substantially above and at one end of said receiving means, means for loading a work gear by gravity into a first position in operative association with said receiving means adjacent the other end thereof, positioning means for engaging a work gear and moving it along said receiving means from said first position to a chamfering position in association with the chamfering cutter, said receiving means including means for releasing the work gear following chamfering for further downward movement by gravity to clear the receiving means for a subsequent chamfering operation.

19. A machine as set forth in claim 18 wherein the receiving means further includes a supporting arbor and means for relatively moving the arbor and work gear into supporting relationship during work gear rotation.

20. A machine for chamfering gear teeth comprising a base, a cutter head on said base including a cutter holder at a chamfering zone, an index gear supported for rotation on said base, means for driving said cutter holder and index gear in timed relation to one another, guide means extending along a portion of said index gear, loading means for placing a work gear between said index gear and said guide means in mesh with the index gear at a first location axially removed from the chamfering zone, whereby the work gear is brought into rotation in timed relation with said cutter holder but displaced therefrom, a work gear supporting spindle, actuating means connected to said spindle for forward projection into the work gear for locating the work gear transverse its axis and for retraction to release the work gear, and positioning means on said base for engaging a work gear at said first location and moving it axially along said index gear and clear of said guide means to the chamfering zone.

References Cited in the file of this patent
UNITED STATES PATENTS

| | | |
|---|---|---|
| 2,201,500 | Poock | May 21, 1940 |
| 2,576,497 | Austin et al. | Nov. 27, 1951 |
| 2,649,032 | Moncrieff | Aug. 18, 1953 |
| 2,730,019 | Christman | Jan. 10, 1956 |